Aug. 14, 1928.
V. S. DOWNING
1,680,508
ILLUMINATING LAMP FOR AUTOS
Filed July 27, 1927
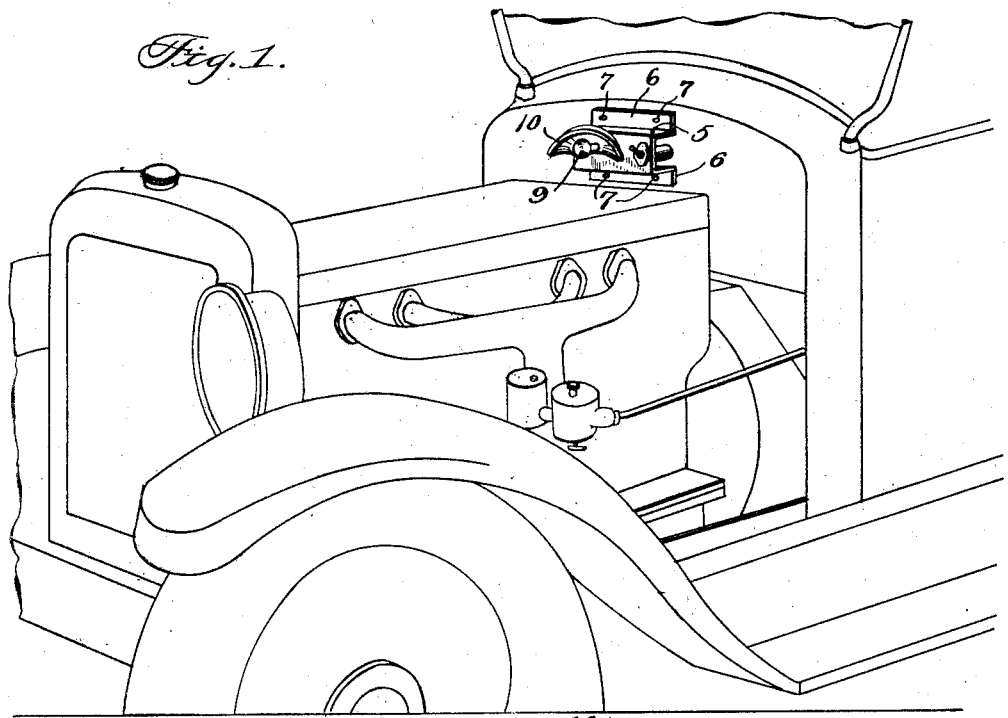
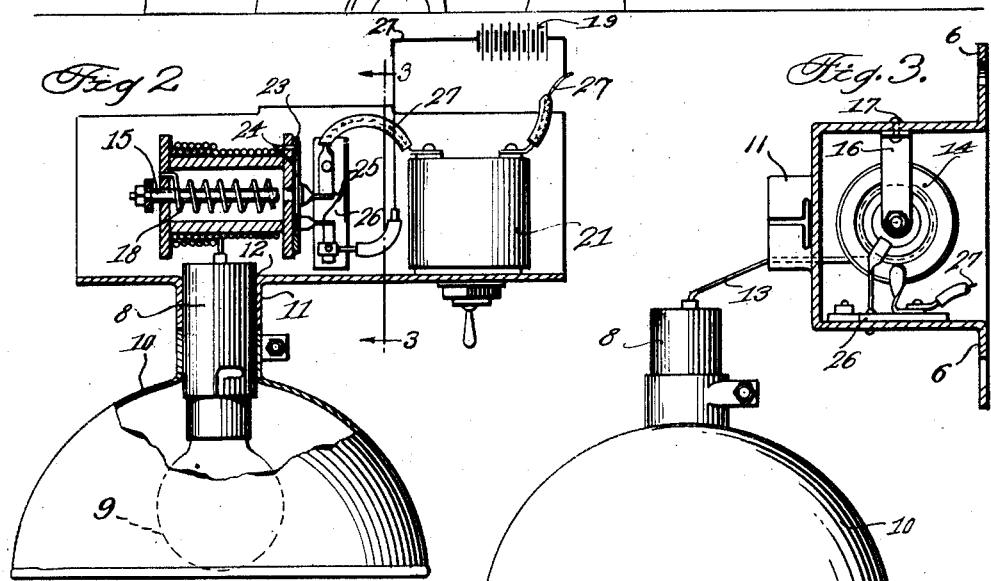
INVENTOR
VIRGIL S. DOWNING
BY
ATTORNEY Patented Aug. 14, 1928.

1,680,508

UNITED STATES PATENT OFFICE.

VIRGIL S. DOWNING, OF JACKSON, MISSISSIPPI.

ILLUMINATING LAMP FOR AUTOS.

Application filed July 27, 1927. Serial No. 208,852.

My invention relates to illuminating lamps for automobiles and more particularly to an extensible trouble lamp.

An object of this invention is to provide an extensible trouble lamp for automobiles wherein the various parts are arranged and supported from a single bracket which may be readily attached to an automobile dash board beneath the hood thereof.

The invention further contemplates an electric trouble lamp for motor vehicles embodying an extensible illuminating bulb electrically connected with an extensible conductor which in turn is in circuit with the automobile electric system.

With the preceding and other objects and advantages in mind the invention consists in the combination of elements, constructions, arrangement of parts and operations to be hereinafter specifically referred to, claimed and illustrated in the accompanying drawings wherein:

Figure 1 is a fragmentary perspective of an automobile equipped with the invention;

Figure 2 is a view partly in horizontal section and partly in elevation of my improved trouble lamp with its electric circuit shown diagrammatically;

Figure 3 is a vertical sectional view of the device with the lamp partly extended.

Referring to the invention in detail a supporting bracket 5 is provided. This bracket 5 is formed from a length of sheet metal bent into channel shaped formation and carrying at the longitudinal edges of its parallel flanges laterally extending securing ears 6. As illustrated in Figure 1 the channel-shaped bracket is arranged upon the outer face of the automobile dash board below the hood and adjacent the engine with its parallel flanges disposed horizontally and the securing ears held to the dash board by removable fastenings 7 engaging the dash board.

A lamp base or plug 8 carrying an illuminating bulb 9 and a reflector 10 is provided, and as illustrated in Figures 2 and 3, is normally received by a laterally extending annular flange 11 surrounding an opening 12 in the vertical leg of the channel shaped bracket.

To permit the lamp to be extended to various points about the automobile an extensible conductor 13 to be wound or unwound from a drum 14 is electrically connected with the base or plug 8. The drum 14 is arranged between the horizontal flanges of the bracket and is supported upon a horizontal shaft 15 carried by vertical arms 16 depending from the underface of the upper flange of the bracket and secured thereto by rivets or other suitable fastenings 17. A helically wound spring 18 is received upon the shaft and within the drum with one end attached to the shaft and its opposite end attached to the drum so that upon rotation of the drum in one direction incident to withdrawal of the conductor the spring will be wound to rotate the drum in the reverse direction to rewind the conductor upon release of the lamp.

The electrical circuit for operating the lamp includes the usual automobile supply, battery 19, having one terminal electrically connected to one of the binding posts of a switch 21 attached to the vertical leg of the bracket by conductor 22. Spaced concentric collector rings 23 are fixed to one end of the drum each of which have electrical connection with one terminal of the conductor 13 as at 24. Brushes or contacts 25 are mounted upon an insulating block 26 attached to the lower horizontal flange of the bracket at a point to one side of the collector rings and resiliently contacts with the latter. Conductors 27 are electrically connected with one of the battery terminals and brushes and the other switch terminal and remaining brush respectively.

It will be apparent that upon actuation of the switch to close the circuit an electric circuit will be completed through the lamp by way of the switch 21, conductor 13, through the bulb 9 and back to the battery by way of the ground connection.

With my improved lamp it will be apparent that illumination may be had at any desirable point about the automobile mechanism thus permitting repair or adjustments in an emergency.

I claim:

1. In a device of the character described, a channel shaped bracket adapted to be attached to a support with its parallel flanges extending horizontally and having a central opening in its vertical leg, arms depending from the upper flange of the bracket, a drum rotatably supported thereby, a conductor wound about the drum and adapted to be withdrawn therefrom, an extensible illuminating lamp attached to the conductor and normally supported in the opening, and means operative upon withdrawal of the conductor to rewind the latter upon manual release of the illuminating lamp.

2. In a device of the character described, a channel shaped bracket adapted to be attached to a support with two parallel flanges extending horizontally and having a central opening in its vertical leg, arms depending from the upper flange of the bracket, a drum rotatably supported thereby, a conductor wound about the drum and adapted to be withdrawn therefrom, an extensible illuminating lamp attached to the conductor and normally supported in the opening, and means operative upon withdrawal of the conductor to rewind the latter upon manual release of the illuminating lamp, collector rings carried by the drum and having electrical connection with the conductor, brushes engaging the collector rings, a switch carried by the bracket and electrically connected with the brushes, a source of electrical energy having electrical connection with the conductor and switch.

3. In a device of the character described, a channel-shaped bracket adapted to be attached to a support with its parallel flanges extending horizontally and having a central opening in its vertical leg, arms depending from the upper flange of the bracket, a drum rotatably supported thereby, a conductor wound about the drum and adapted to be withdrawn therefrom, and an extensible illuminating lamp attached to the conductor and normally supported in the opening.

VIRGIL S. DOWNING.